(12) United States Patent
Sekiguchi

(10) Patent No.: US 9,902,119 B2
(45) Date of Patent: Feb. 27, 2018

(54) PUNCTURE REPAIR LIQUID-HOLDING CONTAINER

(71) Applicant: The Yokohama Rubber Co., LTD., Minato-ku, Tokyo (JP)

(72) Inventor: Takumi Sekiguchi, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 15/103,799

(22) PCT Filed: Dec. 2, 2014

(86) PCT No.: PCT/JP2014/081818
§ 371 (c)(1),
(2) Date: Jun. 10, 2016

(87) PCT Pub. No.: WO2015/087737
PCT Pub. Date: Jun. 18, 2015

(65) Prior Publication Data
US 2016/0318265 A1    Nov. 3, 2016

(30) Foreign Application Priority Data
Dec. 10, 2013 (JP) ................................. 2013-254892

(51) Int. Cl.
*B65D 37/00* (2006.01)
*B29C 73/16* (2006.01)
(Continued)

(52) U.S. Cl.
CPC ........ *B29C 73/166* (2013.01); *B29D 30/0685* (2013.01); *B65D 1/0223* (2013.01);
(Continued)

(58) Field of Classification Search
CPC . B29C 73/006; B29C 73/166; B29D 30/0685; B65D 1/0223; B65D 1/32; B65D 35/08
(Continued)

(56) References Cited

U.S. PATENT DOCUMENTS 3,347,419 A * 10/1967 Brandt .................. B65D 35/10
222/107
3,381,818 A * 5/1968 Cope ...................... B65D 35/02
206/524.2
(Continued)

FOREIGN PATENT DOCUMENTS

JP      S49-054940    5/1974
JP      S52-045272    10/1977
(Continued)

OTHER PUBLICATIONS

International Search Report for International Application No. PCT/JP2014/081818 dated Feb. 17, 2015, 4 pages, Japan.

*Primary Examiner* — Lien Ngo
(74) *Attorney, Agent, or Firm* — Thorpe North & Western

(57) ABSTRACT

Provided is a puncture repair liquid-holding container that allows for improved squeezability while suppressing puncture repair liquid degradation. In a puncture repair liquid-holding container in which puncture repair liquid is contained within a container body, the container body being squeezed during use to dispense the puncture repair liquid from an opening, the container body includes a large-circumference section and a small-circumference section, the large-circumference section being disposed on a side of the container body on which the opening is present, and the small-circumference section being disposed on a side of the container body on which a bottom is present.

5 Claims, 8 Drawing Sheets

(51) Int. Cl.
*B65D 1/02* (2006.01)
*B65D 1/32* (2006.01)
*B65D 35/08* (2006.01)
*B29D 30/06* (2006.01)
*B29C 73/02* (2006.01)

(52) U.S. Cl.
CPC ............... *B65D 1/32* (2013.01); *B65D 35/08* (2013.01); *B29C 73/02* (2013.01)

(58) Field of Classification Search
USPC .......... 222/206, 207, 215, 92, 95, 106, 107; 220/560.02, 666; 141/38; 152/370; 156/97
See application file for complete search history.

(56) References Cited

U.S. PATENT DOCUMENTS

| | | | |
|---|---|---|---|
| 4,863,014 A * | 9/1989 | Summons | B65D 83/0005 206/229 |
| 6,506,464 B1 * | 1/2003 | Montenieri | B29C 49/0005 428/36.7 |
| 8,662,350 B2 * | 3/2014 | Nakatsuka | A61O 5/62 222/105 |
| 2006/0117909 A1 * | 6/2006 | Hsu | B29C 73/025 81/15.6 |
| 2012/0037267 A1 | 2/2012 | Senno et al. | |
| 2014/0373974 A1 * | 12/2014 | Ragan | B29C 73/166 141/114 |

FOREIGN PATENT DOCUMENTS

| | | |
|---|---|---|
| JP | S50-034154 | 9/1980 |
| JP | S55-0134951 | 9/1980 |
| JP | H07-02261 | 1/1995 |
| JP | 2005-187751 | 7/2005 |
| JP | 2009-248982 | 10/2009 |
| JP | 2013-136176 | 7/2013 |
| WO | WO 2010/123113 | 10/2010 |

* cited by examiner

PUNCTURE REPAIR LIQUID-HOLDING CONTAINER

TECHNICAL FIELD

The present technology relates to puncture repair liquid-holding containers, and, more specifically, to a puncture repair liquid-holding container that suppresses puncture repair liquid degradation and allows for improved squeezability while maintaining the shape retention of the container.

BACKGROUND ART

In recent years, when a tire mounted to a vehicle is punctured, puncture repair liquid is injected into the tire via the tire valve to temporarily repair the puncture, and the tire is filled with air. Installing a puncture repair device of this sort in a vehicle eliminates the need for carrying a spare tire in the vehicle, thereby conserving resources and reducing vehicle weight. This arrangement also yields the advantage that a space provided in the vehicle for carrying the spare tire can be used for other purposes.

One example of a device for injecting puncture repair liquid is a hand-squeezable tire repair kit constituted by puncture repair liquid contained in a flexible container, the container being manually squeezed to inject the puncture repair liquid into a tire (see, for example, Japanese Unexamined Patent Application Publication No. 2009-248982A).

It is desirable that the puncture repair liquid-holding container used in a hand-squeezable tire repair kit of this sort easily deform when squeezed (i.e., exhibit superior squeezability) so that a user can easily repair the tire. Meanwhile, because it must be repeatedly squeezed in order to dispense all of the puncture repair liquid, the container must also exhibit superior shape retention. The outer wall of the puncture repair liquid-holding container must also be of suitable thickness in order to prevent degradation of the puncture repair liquid during storage. This results in the difficult problem of improving the squeezability of the container while maintaining the shape retention and puncture repair liquid degradation preventing capability thereof. In particular, because the squeezability of a puncture repair liquid-holding container at low temperatures decreases as the thickness of the outer wall thereof increases, there is demand for a high balance between preventing puncture repair liquid degradation and improving squeezability.

SUMMARY

The present technology provides a puncture repair liquid-holding container that suppresses puncture repair liquid degradation and allows for improved squeezability while maintaining the shape retention of the container. The present technology relates to a puncture repair liquid-holding container, and, more specifically, to a puncture repair liquid-holding container that suppresses puncture repair liquid degradation and allows for improved squeezability while maintaining the shape retention of the container.

A puncture repair liquid-holding container according to the present technology includes a container body and an opening, puncture repair liquid being contained in the container body, and the container body being squeezed during use to dispense the puncture repair liquid from the opening. In such a puncture repair liquid-holding container, the container body includes a large-circumference section and a small-circumference section having a circumference less than that of the large-circumference section, the large-circumference section being disposed on a side of the container body on which the opening is present, and the small-circumference section being disposed on a side of the container body on which a bottom is present.

Because the present technology is provided with the small-circumference section having a relatively small circumference on the bottom side away from the opening, as described above, the puncture repair liquid within the container migrates to the large-circumference section on the opening side having the relatively large circumference when the container is inverted to inject the puncture repair liquid, while air migrates toward the bottom side of the container, forming a space in which the puncture repair liquid is not present in the small-circumference section. The height of this space in the small-circumference section, which has a smaller cross-sectional area than the large-circumference section by virtue of its small circumference, is greater than in a conventional container of unvarying circumference, forcing more of the puncture repair liquid within the container toward the opening than would be if a conventional container were used. As a result, the puncture repair liquid can be more efficiently injected into the tire. In addition, the liquid surface of the puncture repair liquid is present in the small-circumference section at the beginning of the tire repair process, allowing the area near the liquid surface to be compressed by squeezing the small-circumference section, and allowing the puncture repair liquid to be more efficiently delivered. Moreover, the small circumference of the small-circumference section allows the section to be easily grasped by hand, enabling a user to easily squeeze the container. In this way, the small-circumference section facilitates squeezing and injection of the puncture repair liquid, thereby eliminating the need for improving squeezability by reducing the thickness of the outer wall of the puncture repair liquid-holding container to make the container itself more flexible. It is thus possible to ensure sufficient outer wall thickness, prevent degradation of the puncture repair liquid, and maintain the shape retention of the container.

In the present technology, it is preferable that the bottom of the container body have a convex shape that protrudes toward the outside of the container. Imparting such a shape allows the container to easily deform when squeezed, which is advantageous for improving squeezability.

In the present technology, it is preferable that a line indicating one-half the volume of the container body when the container is upright be positioned within a range from 60% to 80% of the cross-sectional height of the container body. This yields a satisfactory balance between the large-circumference section and the small-circumference section, which is advantageous for striking a balance between improving squeezability and preventing degradation of the puncture repair liquid.

In the present technology, it is preferable that the small-circumference section have a wall thickness greater than that of the large-circumference section. This improves the shape retention of the squeezed section, facilitating repeated squeezing.

In the present technology, it is preferable that the outer wall of the container body have a multilayered structure including at least three layers, an intermediate layer of the multilayered structure being made of a gas barrier resin. This allows degradation of the puncture repair liquid to be effectively prevented.

DETAILED DESCRIPTION

The configuration of the present technology will now be described in detail with reference to the attached drawings.

Figure 1:
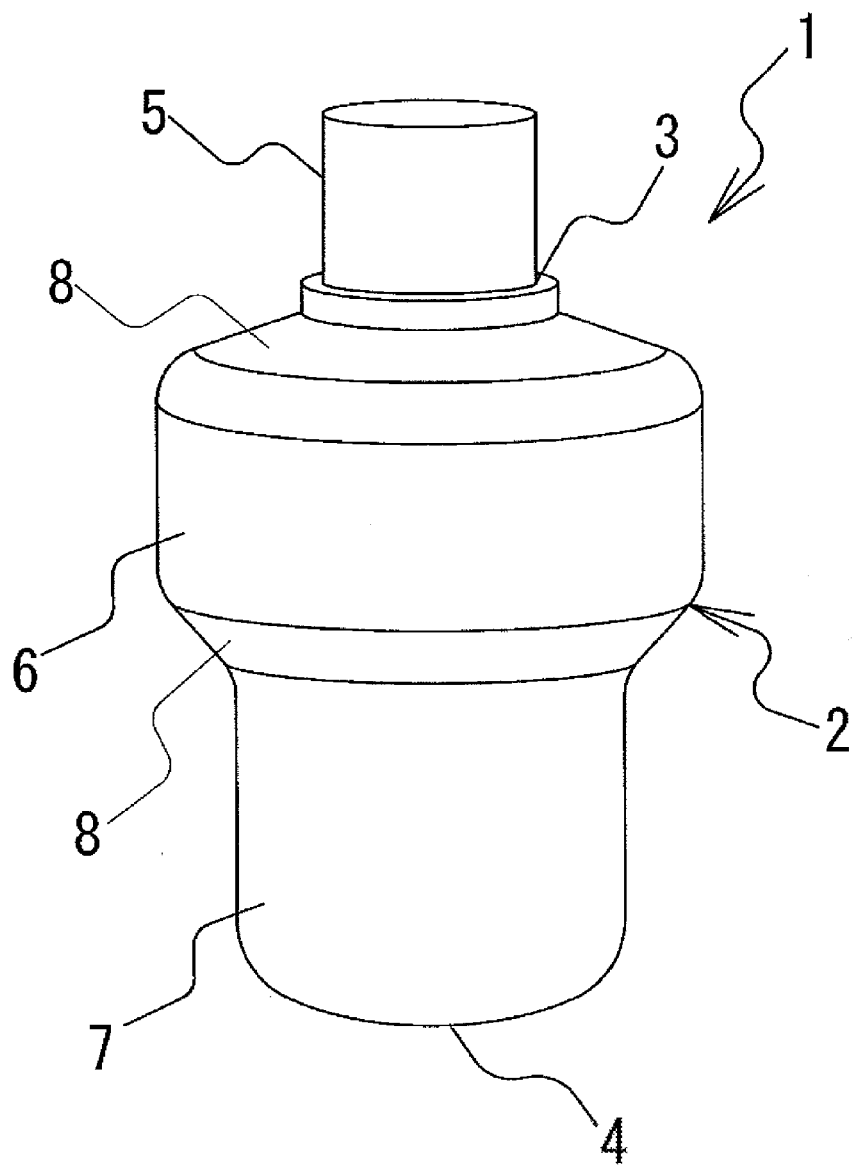
FIG. 1 is a perspective view of a puncture repair liquid-holding container according to an embodiment of the present technology.
Figure 2:
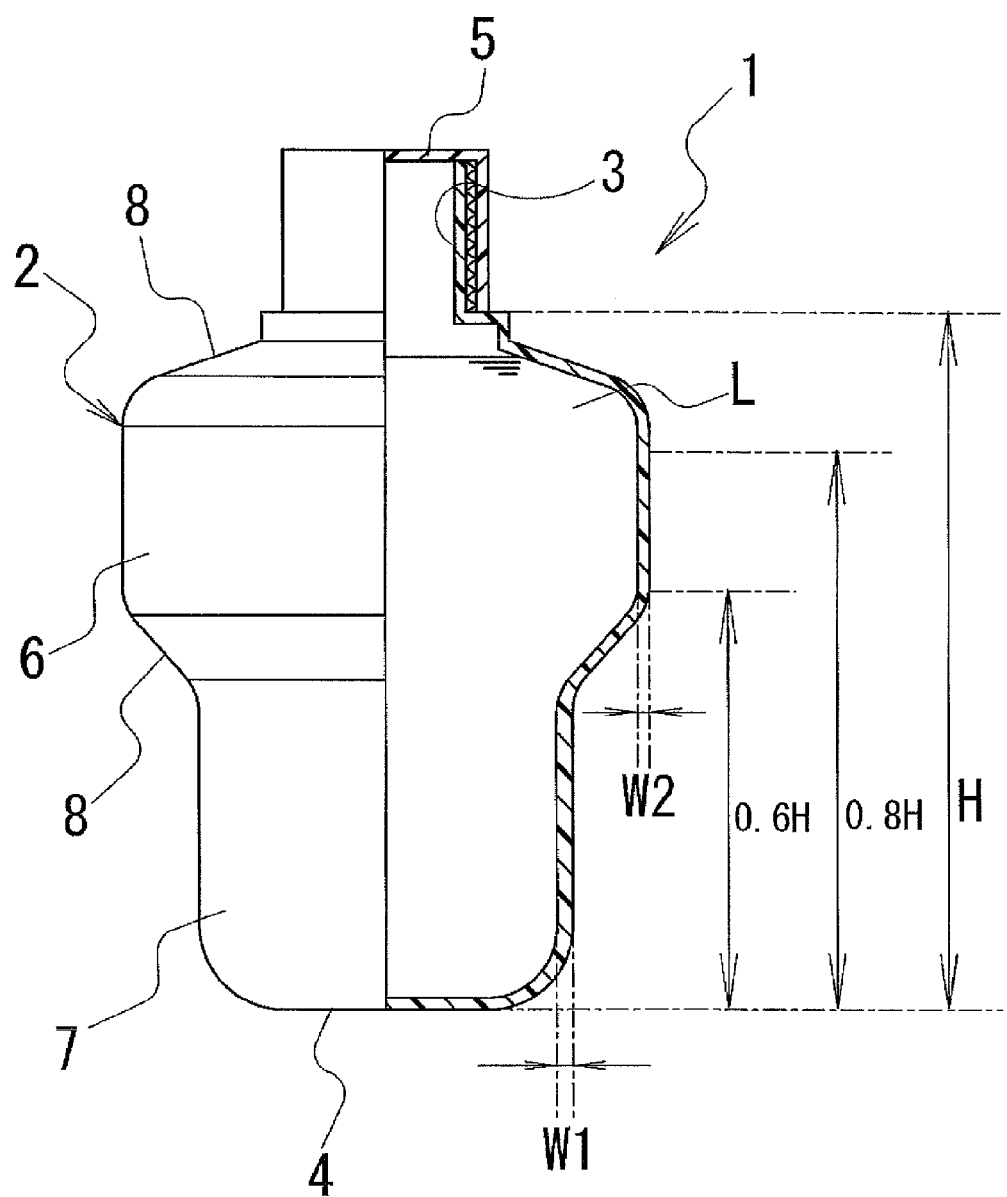
FIG. 2 is a partially cut-out frontal view of the puncture repair liquid-holding container illustrated in FIG. 1.

As illustrated in FIGS. 1 and 2, a puncture repair liquid-holding container 1 (hereafter, "container 1") includes a container body 2 containing puncture repair liquid L ("repair liquid L") containing, for example, rubber latex, and an opening 3 that is positioned on the upper side of the container body 2 when the container 1 is upright and through which the repair liquid L is dispensed during use. When the container 1 is upright, a bottom 4 of the container body 2 is on a side opposite the opening 3. The opening 3 is sealed by a film (not illustrated), and a cap 5 for protecting the film is attached thereto.

The container body 2 includes a cylindrical large-circumference section 6 having a relatively large circumference and a cylindrical small-circumference section 7 having a relatively small circumference, the large-circumference section 6 and the small-circumference section 7 being joined by a tapering surface 8. The respective boundaries between the large-circumference section 6 and the tapering surface 8 and between the small-circumference section 7 and the tapering surface 8 are chamfered, smoothly connecting these sections. The boundary between the outer wall of the small-circumference section 7 and the bottom 4 of the container body 2 is also chamfered.

The opening 3 is molded in a cylindrical shape and provided on the top part of the large-circumference section 6 (container body 2). In the embodiment illustrated in FIGS. 1 and 2, another tapering surface 8 is provided to the opening 3 side of the large-circumference section 6; this tapering surface 8 joins the large-circumference section 6 (container body 2) and the opening 3. In the present embodiment, a screw thread is formed on the outer surface of the opening 3 so as to mate with a screw thread (female screw) on the cap 5.

The container body 2 and opening 3 are integrally made of, for example, a synthetic resin such as polyethylene.

A tire repair process using the container 1 configured as described above will now be described.

Figure 3:
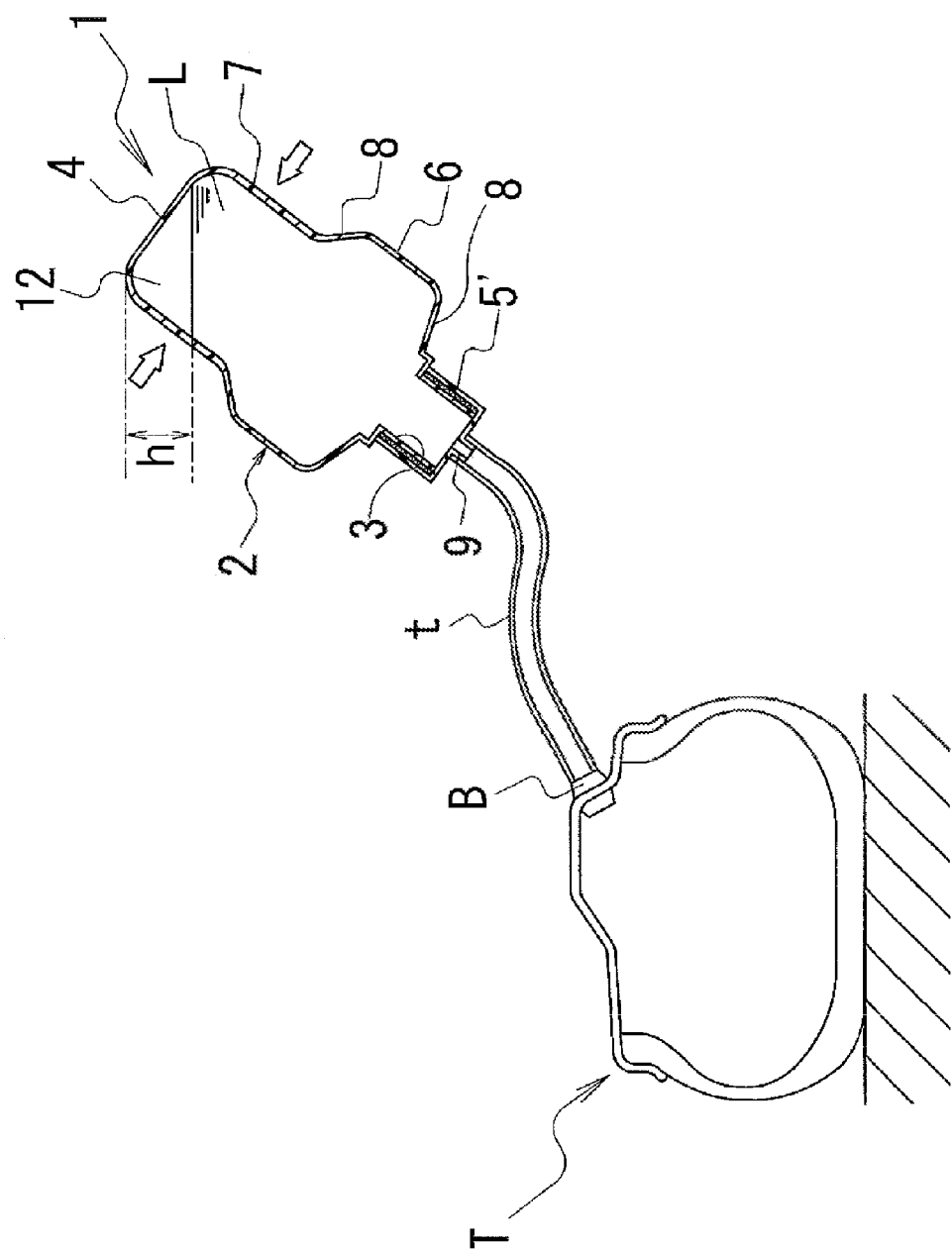
FIG. 3 is a schematic illustration of the state of the puncture repair liquid-holding container illustrated in FIG. 1 when being used.

As illustrated in FIG. 3, the storage cap 5 is replaced with a tire repair cap 5' for the tire repair process. At this time, the film (not illustrated) blocking the opening is removed or broken. A dispensing opening 9 to which is connected a tube t for connecting a valve B of a tire T and the container 1 is provided in the tire repair cap 5'. After being connected to the tire T by the tube t, the container 1 is placed in an inverted state with the opening 3 facing downward, and a user manually squeezes the outer wall of the container body 2 in the direction indicated by the arrow in FIG. 3 in order to dispense puncture repair liquid L from the dispensing opening 9 and inject the repair liquid into the tire T. When the user lets up on the squeezing force, air within the tire returns to the interior of the container, and the outer wall of the container 1 returns to its original shape. This process is repeated in order to inject all of the puncture repair liquid L within the container 1 into the tire.

The provision of the small-circumference section 7 having a small-circumference in the container 1 of the present technology allows a user to more easily grip the container 1 by hand, facilitating the squeezing process. In addition, the provision of the small-circumference section 7 on the bottom 4 side away from the opening 3 results in the puncture repair liquid L within the container 1 to migrate to the large-circumference section 6 on the opening 3 side when the container 1 is inverted in order to inject the puncture repair liquid L, while air migrates toward the bottom 4 side of the container 1, thereby forming a space 12 in which no puncture repair liquid L is present in the small-circumference section 7. The height h of this space 12 in the small-circumference section 7, which has a smaller cross-sectional area than the large-circumference section 6 by virtue of its small circumference, is greater than in a conventional container of unvarying circumference, forcing more of the puncture repair liquid L within the container 1 toward the opening 3 than would be if a conventional container were used. As a result, the puncture repair liquid L can be more efficiently injected into the tire T. In addition, the liquid surface of the puncture repair liquid L is present in the small-circumference section 7 at the beginning of the tire repair process, allowing the area near the liquid surface to be compressed by squeezing the small-circumference section 7, and allowing the puncture repair liquid L to be more efficiently delivered. In this way, the small-circumference section 7 facilitates squeezing and injection of the puncture repair liquid L, thereby eliminating the need for improving squeezability by reducing the thickness of the outer wall of the container 1 to make the container 1 itself more flexible. It is thus possible to ensure sufficient outer wall thickness, prevent degradation of the puncture repair liquid L, and maintain the shape retention of the container 1.

The container body 2 and opening 3 are made of a synthetic resin, as discussed above. An arrangement in which the outer wall of the container body 2 has a multi-layered structure including at least three layers, and the intermediate layer positioned between the outer layer and the inner layer of the multilayered structure being made of a gas barrier resin, is also possible. This allows degradation of the puncture repair liquid to be effectively prevented. An ethylene/vinyl alcohol resin, for example, can be used as the gas barrier resin.

The circumference of the small-circumference section 7 is preferably in a range from 75% to 95% of the circumference of the large-circumference section 6. This results in a satisfactory balance between the large-circumference section 6 and the small-circumference section 7, allowing for improved squeezability. If the circumference of the small-circumference section 7 is less than 75% of the circumference of the large-circumference section 6, the difference in circumference between the large-circumference section 6 and the small-circumference section 7 will be too great, resulting in an unbalanced shape for the container 1. If the circumference of the small-circumference section 7 is more than 95% of the circumference of the large-circumference section 6, there will be almost no difference in circumference between the large-circumference section 6 and the small-circumference section 7, making it difficult to sufficiently obtain the squeezability-improving effect described above.

In the present technology, it is preferable that a line indicating one-half the volume of the container body 2 (hereafter, "half-volume line") when the container 1 is upright be positioned within a range from 60% to 80% of the cross-sectional height H of the container body 2. In a conventional container of unvarying circumference, the half-volume line is positioned at roughly 50% of the cross-sectional height of the container body 2. However, setting the half-volume line at a higher position than in a conventional container as described above yields a satisfactory balance between the large-circumference section 6 and the small-circumference section 7, which is advantageous in striking a balance between improving squeezability and preventing degradation of the puncture repair liquid L. If the half-volume line is lower than 60% of the cross-sectional height H, there will be almost no difference in circumference between the large-circumference section 6 and the small-circumference section 7, making it difficult to sufficiently obtain the squeezability-improving affect described above. If the half-volume line is higher than 80% of the cross-sectional height H, the proportion of the container body 2 occupied by the small-circumference section 7 will be too great, resulting in an unbalanced shape.

In the present technology, it is preferable that the small-circumference section 7 have a wall thickness W1 greater than a wall thickness W2 of the large-circumference section 6. This improves the shape retention of the squeezed section (i.e., the small-circumference section 7), facilitating repeated squeezing. The wall thickness W1 of the small-circumference section 7 is preferably 10% to 30% greater than the wall thickness W2 of the large-circumference section 6, more preferably 20% to 30% greater. Creating a clear difference in wall thickness between these two sections in this way allows for sufficient improvement of the shape retention of the small-circumference section 7. The wall thickness W1 of the small-circumference section 7 may be set in a range, for example, of 0.5 mm to 1.5 mm.

It is also possible to attach an elastic band such as a rubber band to the small-circumference section 7 in order to improve the shape retention of the squeezed section (small-circumference section 7). Alternatively, circular ribs may be provided on the outer surface of the small-circumference section 7.

The small-circumference section 7 is easy to grip by virtue of its small circumference. An indicator mark indicating the position to be squeezed may be provided on the outer surface of the small-circumference section 7 so as to make it clear to a user that this section is to be squeezed.

Figure 4A:
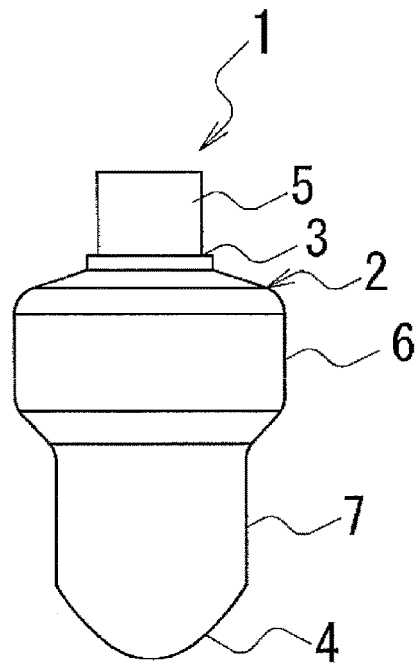
FIGS. 4A to D are frontal views of puncture repair liquid-holding containers according to other embodiments of the present technology.
Figure 4B:
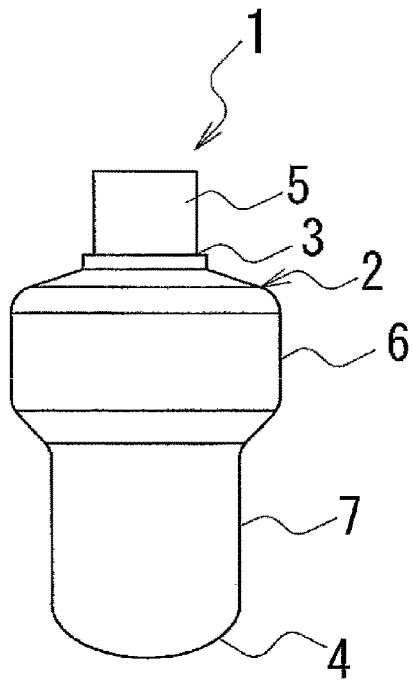
Figure 4C:
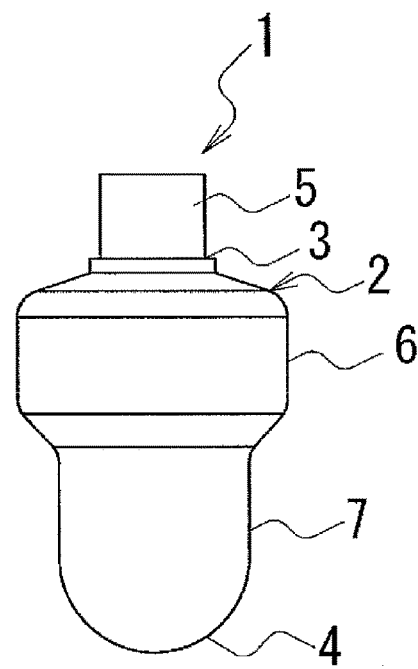
Figure 4D:
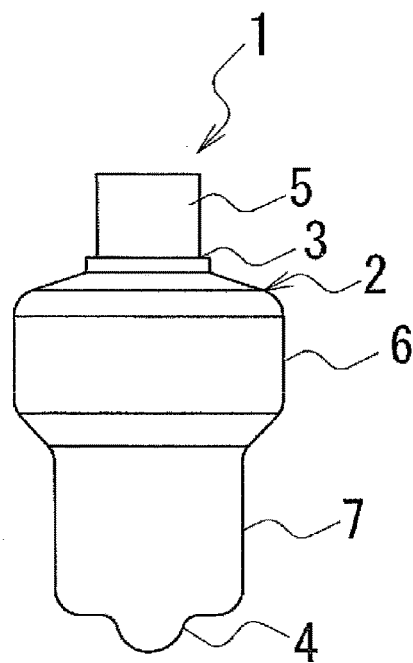

In the embodiment illustrated in FIGS. 1 and 2, the bottom 4 of the container body 2 is flat; however, it is preferable that the bottom 4 of the container body 2 have a convex shape protruding toward the outside of the container 1, as illustrated in FIGS. 4A to D. In FIG. 4A, the entire outline of the bottom 4 of the container body 2 has a radially protruding convex shape. In FIG. 4B, the entire outline of the bottom 4 of the container body 2 has a semi-elliptically protruding convex shape the major axis of which is constituted by the widthwise dimension of the container body 2. In FIG. 4C, the entire outline of the bottom 4 of the container body 2 has a semicircularly protruding convex shape. In FIG. 4D, the central section of the bottom 4 of the container body 2 has a semicircularly protruding partially convex shape. Imparting such a shape allows the container to easily deform when squeezed, which is advantageous for improving squeezability.

Figure 5A:
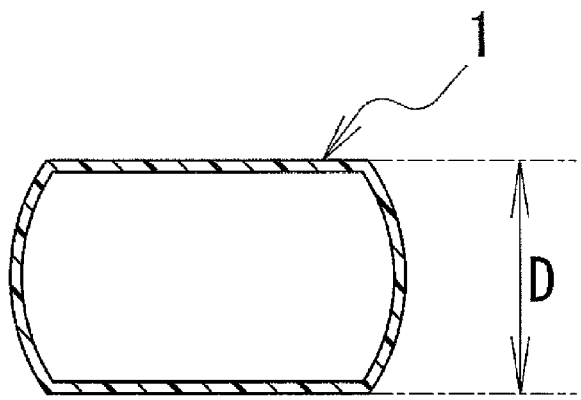
FIGS. 5A to C are cross-sectional views of puncture repair liquid-holding containers according to yet other embodiments of the present technology.
Figure 5B:
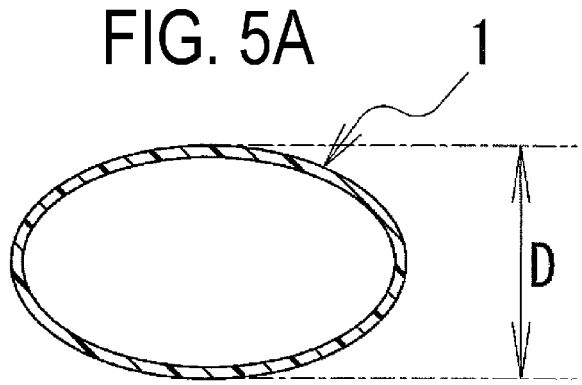
Figure 5C:
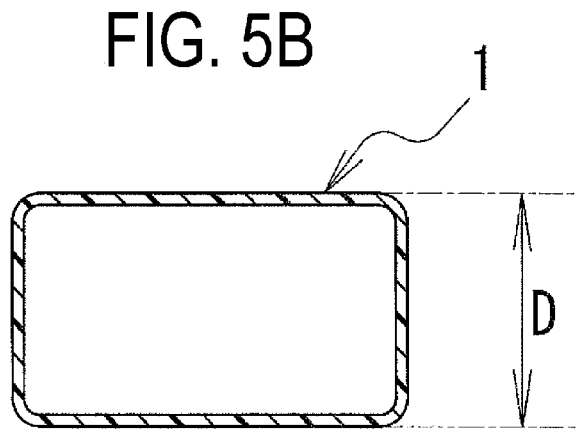

In the present technology, the cross-sectional shape of the container 1 is not limited to the circular shape illustrated in FIGS. 1 and 2 as long as the circumferential lengths of the large- and small-circumference sections satisfy the relationship described above. For example, an oblate shape such as illustrated in FIG. 5A, an elliptical shape such as illustrated in FIG. 5B, or a quadrangular shape such as illustrated in FIG. 5C may be used. The large-circumference section 6 and the small-circumference section 7 may have identical or different cross-sectional shapes.

In the case of the oblate shape illustrated in FIG. 5A, the elliptical shape illustrated in FIG. 5B, or the quadrangular shape illustrated in FIG. 5C (especially if the shape is a rectangular shape), the minimum thickness D of the small-circumference section 7 may be set, for example, within a range from 40 mm to 60 mm. This allows for efficient squeezing of the small-circumference section 7.

The present technology is not limited to the shape illustrated in FIGS. 1 and 2; a variety of shapes may be used as long as the container body 2 includes a large-circumference section 6 and a small-circumference section 7, the large-circumference section 6 is disposed on the opening 3 side of the container body 2, and the small-circumference section 7 is disposed on the bottom 4 side of the container body 2.

Figure 6:
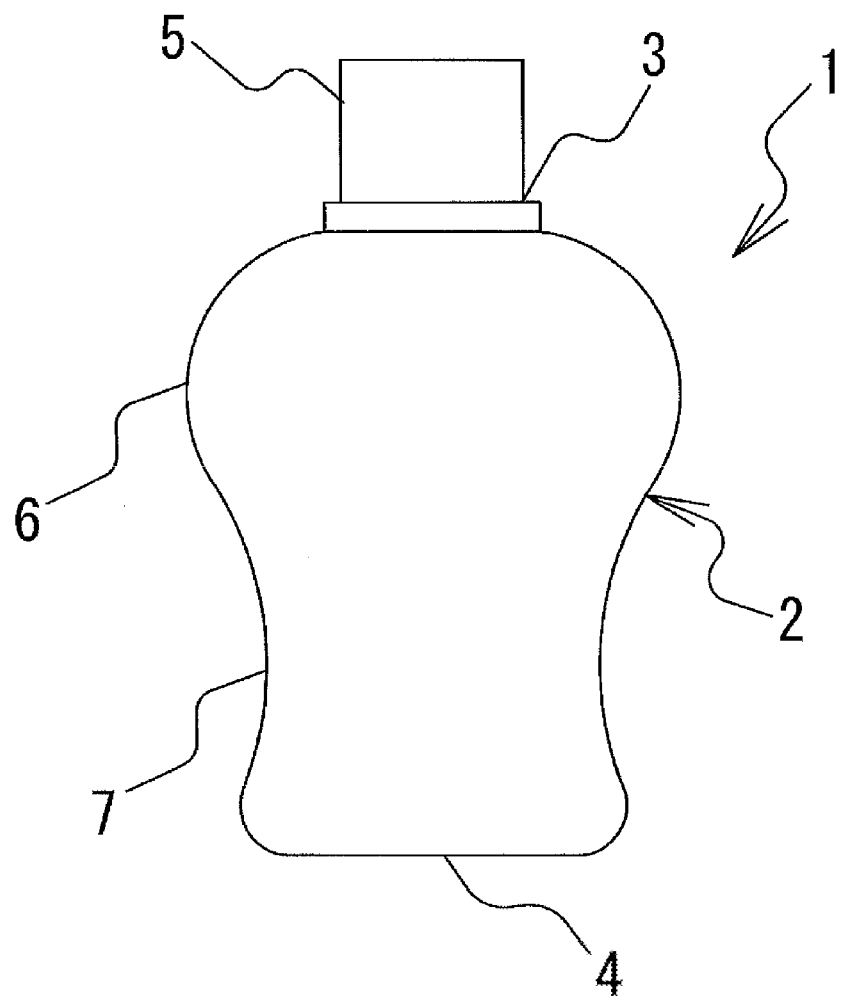
FIG. 6 is a frontal view of a puncture repair liquid-holding container according to yet another embodiment of the present technology.

For example, in the modified example illustrated in FIG. 6, a large-circumference section 6 having a truncated spherical shape and a cylindrical small-circumference section 7 having a constricted section in the central part thereof with respect to the vertical direction are smoothly joined. In other words, the outline of the large-circumference section 6 has an arc-like shape that protrudes toward the outside of the container body 2, the outline of the small-circumference section 6 has an arc-like shape that protrudes toward the inside of the container body 2, and these two arcs are smoothly joined.

Figure 7:
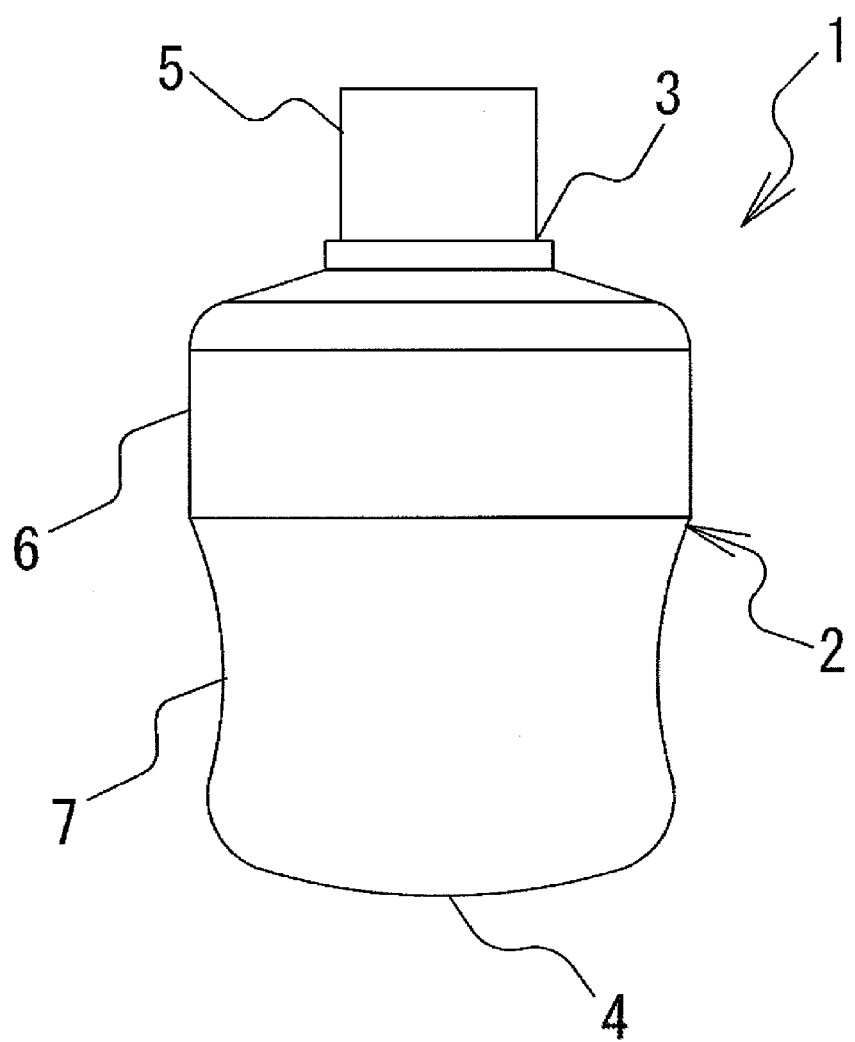
FIG. 7 is a frontal view of a puncture repair liquid-holding container according to yet another embodiment of the present technology.

In the modified example illustrated in FIG. 7, a cylindrical large-circumference section 6 is joined to a cylindrical small-circumference section 7 having a constricted section in the central part thereof with respect to the vertical direction. In other words, the outline of the large-circumference section 6 has a rectilinear shape, whereas the outline of the small-circumference section 7 has an arc-like shape recessed toward the inside of the container body 2.

Figure 8:
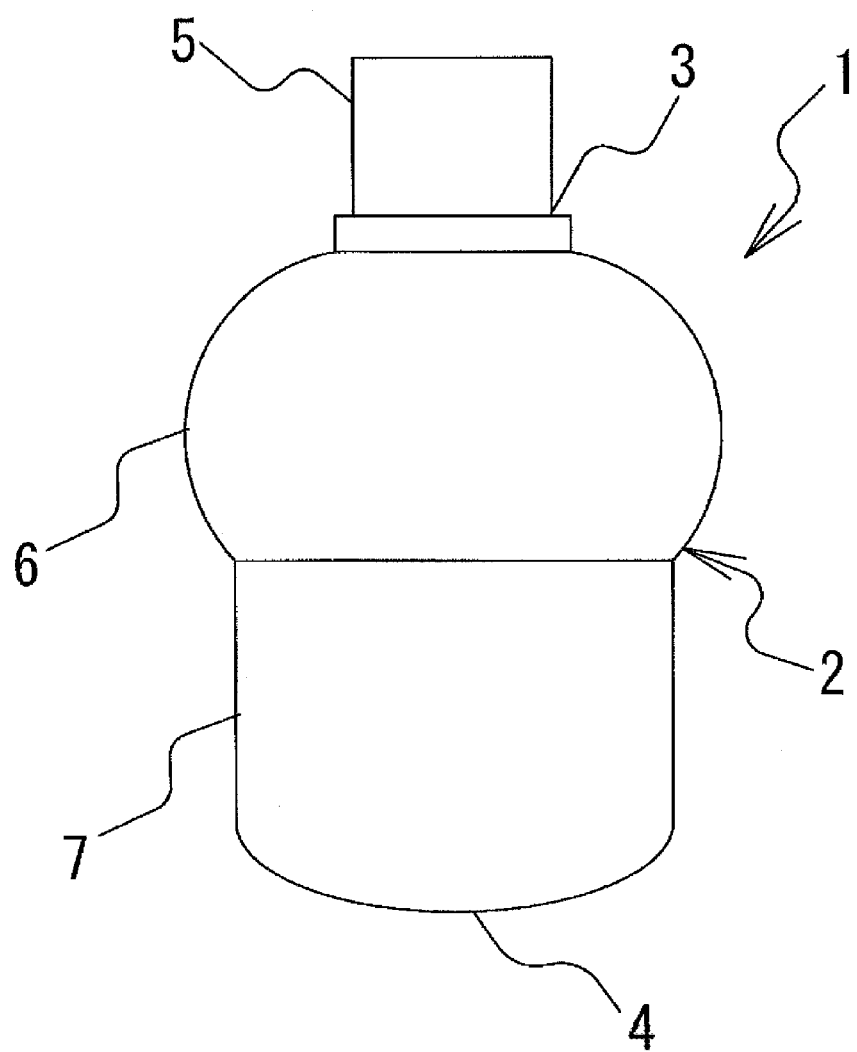
FIG. 8 is a frontal view of a puncture repair liquid-holding container according to yet another embodiment of the present technology.

In the modified example illustrated in FIG. 8, a large-circumference section 6 having a truncated spherical shape is joined to a cylindrical small-circumference section 7. In other words, the outline of the large-circumference section 6 has a convex shape protruding toward the outside of the container body 2, whereas the outline of the small-circumference section 7 has a rectilinear shape.

A variety of configurations, such as the materials and dimensions described above, can be applied to any of the embodiments illustrated in FIGS. 6 to 8.

EXAMPLES

Puncture repair liquid-holding containers according to a Conventional Example 1 and Working Examples 1 to 6 all having a volume of 350 mL and having different dimensions with respect to the presence/absence of large- and small-circumference sections, frontal shape, the ratio of the circumference of the small-circumference section to the circumference of the large-circumference section, the shape of the bottom, the height of the half-volume line, the wall thickness of the large-circumference section, and the wall thickness of the small-circumference section as shown in Table 1 were prepared.

In all of the examples, the outer wall of the container body had a three-layered structure made of a synthetic resin, and the intermediate layer thereof was made of an ethylene/vinyl alcohol resin.

Puncture repair liquid injection time was measured for these experimental examples according to the method described hereafter; results are shown in Table 1.

Puncture Repair Liquid Injection Time

The experimental puncture repair liquid-holding containers were first filled with 350 mL of puncture repair liquid, the puncture repair liquid-holding containers were each connected to a pneumatic tire, and the time required to completely inject all of the puncture repair liquid in the container after beginning squeezing was measured. The evaluation results were expressed as an index value using the inverse of the measurement value, with Conventional Example 1 being assigned an index value of 100. Larger index values indicate shorter injection times and more superior squeezability.

TABLE 1

|  |  | Conventional Example 1 | Working Example 1 | Working Example 2 | Working Example 3 | Working Example 4 | Working Example 5 | Working Example 6 |
|---|---|---|---|---|---|---|---|---|
| Large-/small-circumference sections present? | | No | Yes | Yes | Yes | Yes | Yes | Yes |
| Frontal shape | | — | FIG. 6 | FIG. 7 | FIG. 8 | FIG. 2 | FIG. 2 | FIG. 2 |
| Ratio of circumference of small-circumference section to circumference of large-circumference section | % | — | 80 | 85 | 85 | 80 | 80 | 80 |
| Shape of bottom | | Flat | Flat | Convex | Convex | Flat | Convex | Flat |
| Height of half-volume line | % | 50 | 70 | 65 | 60 | 65 | 60 | 60 |
| Wall thickness of large-circumference section | mm | 1.0 | 0.7 | 0.8 | 0.8 | 0.8 | 0.8 | 0.8 |
| Wall thickness of small-circumference section | mm | 1.0 | 1.3 | 1.2 | 1.2 | 1.2 | 1.2 | 0.8 |
| Puncture repair liquid injection time | Index value | 100 | 106 | 105 | 108 | 111 | 111 | 110 |

As is apparent from Table 1, the containers of Working Examples 1 to 4 exhibited reduced injection times compared to Conventional Example 1. The containers of Working Examples 5 and 6 were based on the container of Working Example 4 but with different bottom shapes and large- and small-circumference section wall thicknesses, but still exhibited considerably reduced injection time compared to Conventional Example 1. Although not shown in Table 1, containers based on the containers of Working Examples 1 to 3 but with, for example, different bottom shapes and large- and small-circumference section wall thicknesses successfully yielded the effect of considerably reducing injection time as in Working Examples 5 and 6.

The invention claimed is:

1. A puncture repair liquid-holding container including a container body and an opening, puncture repair liquid being contained in the container body, and the container body being squeezed during use to dispense the puncture repair liquid from the opening, wherein the container body includes a large-circumference section and a small-circumference section having a circumference less than that of the large-circumference section, the large-circumference section being disposed on a side of the container body on which the opening is present, the small-circumference section being disposed on a side of the container body on which a bottom is present, and the small-circumference section having a wall thickness that is greater than that of the large-circumference section.

2. The puncture repair liquid-holding container according to claim 1, wherein a bottom of the container body has a convex shape protruding toward the outside of the container.

3. The puncture repair liquid-holding container according to claim 1, wherein a line indicating one-half the volume of the container body when the container is upright is positioned within a range from 60% to 80% of the cross-sectional height of the container body.

4. The puncture repair liquid-holding container according to claim 1, wherein an outer wall of the container body has a multilayered structure including at least three layers, an intermediate layer of the multilayered structure being made of a gas barrier resin.

5. The puncture repair liquid-holding container according to claim 2, wherein a line indicating one-half the volume of the container body when the container is upright is positioned within a range from 60% to 80% of the cross-sectional height of the container body.

* * * * *